United States Patent [19]

Prejean

[11] 4,056,208
[45] Nov. 1, 1977

[54] CAUSTIC-RESISTANT POLYMER COATINGS FOR GLASS

[76] Inventor: George Wyatt Prejean, 5807 Lodge Creek, Houston, Tex. 77069

[21] Appl. No.: 712,700

[22] Filed: Aug. 9, 1976

Related U.S. Application Data

[63] Continuation-in-part of Ser. No. 603,661, Aug. 11, 1976, abandoned.

[51] Int. Cl.² .................. B65D 11/16; B32B 27/38; B32B 17/06; B32B 9/04
[52] U.S. Cl. ..................... 215/12 R; 428/35; 428/414; 428/415; 428/417; 428/429; 428/447; 428/448; 428/522; 428/523; 215/DIG. 6; 427/386; 427/387; 427/407 A
[58] Field of Search ............... 427/386, 387, 407 A; 428/35, 414, 415, 417, 428, 429, 447, 448, 451, 523, 522; 215/12 R, DIG. 6

[56] References Cited

U.S. PATENT DOCUMENTS

| | | | |
|---|---|---|---|
| 3,264,272 | 8/1966 | Rees | 428/36 |
| 3,285,802 | 11/1966 | Smith et al. | 428/415 |
| 3,362,843 | 1/1968 | Smith et al. | 428/417 |
| 3,415,673 | 12/1968 | Clock | 428/332 |
| 3,666,539 | 5/1972 | Kiel | 428/441 |
| 3,734,763 | 5/1973 | Plueddemann | 428/441 |
| 3,805,985 | 4/1974 | Hagiwara et al. | 428/35 |
| 3,836,386 | 9/1974 | Roy | 428/35 |
| 3,922,450 | 11/1975 | Stengle | 428/35 |
| 3,998,985 | 12/1976 | Kitaj | 427/386 |

*Primary Examiner*—William R. Dixon, Jr.

[57] ABSTRACT

Improved caustic-resistant coatings for glass which comprise (1) a primer layer consisting essentially of an epoxy resin containing a curing agent, e.g., polyamide, amine, etc., and an organofunctional silane either in a single layer or separate layers, in order on the glass, (a) organofunctional silane and (b) epoxy resin, and (2) a copolymer of alpha-olefins of the formula $R-CH=CH_2$, where R is a radical of hydrogen or alkyl radicals having from 1 to 8 carbon atoms, and alpha, beta-ethylenically unsaturated carboxylic acids having from 3 to 8 carbon atoms, said copolymer having from 0 to 100 percent of the carboxylic acid groups ionized by neutralization with metal ions.

20 Claims, No Drawings

CAUSTIC-RESISTANT POLYMER COATINGS FOR GLASS

This application is a continuation-in-part of application Ser. No. 603,661, filed Aug. 11, 1976, now abandoned.

BACKGROUND OF THE INVENTION

1. Field of the Invention

This invention relates to caustic-resistant coatings for glass, and particularly such coatings which include a primer of a combination of an epoxy resin and an organofunctional silane. The invention has particularly valuable utility for providing clear, caustic resistant, adherent coatings for glass containers which strengthen the container and provide a safety factor.

2. Description of the Prior Art

Copolymers of alpha-olefins and alpha, betaethylenically unsaturated carboxylic acids when used as coatings for surfaces such as glass bottles, do not change the physical appearance of the bottles. The coatings exhibit good initial adhesion to glass, but the adhesion deteriorates rapidly in the presence of high humidity due to hydrophilicity. Beverage bottles of the returnable type are sterilized in a hot caustic solution (e.g., 5 percent NaOH, 70° C.). One or two 15-minute caustic treatments have been found to destroy the adhesion between the glass and the polymers.

in Belgian Pat. No. 822,689, issued May 28, 1975, improved adhesion between glass and ionic copolymers has been achieved by priming the glass with amino- or epoxy functional silane or epoxy resins. About five 15-minute caustic treatments can be tolerated before the adhesion between glass and the ionic copolymer deteriorates. Still further improvement in caustic resistance, e.g., 10 to 15 treatments, is achieved by overcoating the ionic copolymer layer with a polymeric, hydrophobic protective layer, e.g., nylon.

Wells U.S. Pat. No. 3,297,186 describes a method of permanently sealing glass surfaces together using an adhesive composition consisting essentially of a major portion of an epoxy resin, a curing agent and a minor amount of an amino-substituted alkylalkoxysilane. There is no teaching in this patent that a polymer or other nonsilicious material will form a strong caustic-resistent bond to glass via this adhesive.

Kiel U.S. Pat. No. 3,666,539 describes glass coatings having increased permanency of adhesion and capable of being rapidly cured at elevated temperatures. The coatings consist essentially of at least one carboxyl functional acrylic resin, at least one hydroxyl containing epoxy resin and a small effective amount of an ambifunctional epoxy reactive silane. The coating is said to exhibit permanency of adhesion to a glass surface when soaked in 3 percent by weight aqueous NaOH solution at 160° F. (71° C.) for a relatively short period of time. The acrylic compound acts as a curing agent, and the coating provides only poor protection against caustic.

SUMMARY OF THE INVENTION

It has now been found that clear coatings on glass, particularly returnable glass bottles, which exhibit improved caustic-resistance to 15-minute treatments in 5 percent by weight solution of NaOH at 70° to 80° C. comprise, (1) a primer layer consisting essentially of a combination of (A) an organofunctional silane and (B) an epoxy resin containing a curing agent taken from the group consisting of an amine and a polyamide compound where (A) and (B) are in a single layer or in individual layers, with the proviso that the silane layer (A) is adjacent the glass and (2) a copolymeric layer consisting essentially of a copolymer of alpha-olefins of the formula $R-CH=CH_2$, where R is a radical selected from the class consisting of hydrogen and alkyl radicals having from 1 to 8 carbon atoms, and alpha, beta-ethylenically unsaturated carboxylic acids having from 3 to 8 carbon atoms, said copolymers having from 0 to 100 percent of the carboxylic acid groups ionized by neutralization with metal ions, said metal ions having an ionized valence of from one to three inclusive when the unsaturated acid is a monocarboxylic acid and an ionized valence of one when the unsaturated acid is a dicarboxylic acid and said metal ions being selected from the group consisting of uncomplexed and complexed metal ions, said copolymer being a direct copolymer of the alpha-olefins and the unsaturated carboxylic acid in which the carboxylic acid groups are randomly distributed over all molecules and in which (a) the alpha-olefin content of the copolymer is at least 70 mol percent, based on the alpha-olefin-acid copolymer, (b) the unsaturated carboxylic acid content of the copolymer is from 0.2 to 5 mol percent, based on the alpha-olefin-acid copolymer, and (c) any other monomer component optionally copolymerized in said copolymer is monoethylenically unsaturated.

DETAILED DESCRIPTION OF THE INVENTION

The improved clear, caustic-resistant coatings for glass comprise (1) a primer layer consisting essentially of a combination of (A) an organofunctional silane and (B) an epoxy resin in either a single layer, or in individual layers with the silane layer adjacent the glass; and (2) a copolymeric layer which is more fully described below. A curing agent, e.g., polyamide or amine, is present with the epoxy resin. The primer layer(s) may be applied by any one of a number of well known coating means such as spraying of a liquid dispersion or solution, dipping into a solution or dispersion, fluidized bed powder coating, electrostatic powder spraying, etc. Such coatings meet the standard of resisting delamination for at least twelve 15-minute treatments in 5 percent by weight caustic solution at 70 to 80° C.

Suitable silane compounds useful in the primer layer or as a separate layer are organofunctional silanes of the formula: $(RO)_3Si(CH_2)_xR^1$ where RO is a hydrolyzable alkoxy group, R being an alkyl radical of 1 to 4 carbon atoms; $R^1$ is a functional organic group, e.g.,

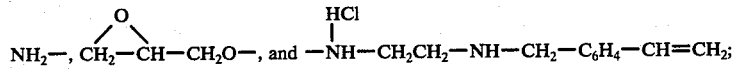

and x is a whole number of 1 to 4. Useful silanes are gamma-aminopropyltriethoxy silane, gamma-glycidoxypropyltrimethoxy silane and N-vinylbenzylaminoethyl-3-trimethoxysilylpropylamine hydrochloride which is preferred.

Epoxy resins useful in combination with the silane compounds include epichlorohydrin/bisphenol A types, epoxy compounds containing one or more oxirane rings

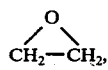

e.g., cycloaliphatic epoxies, etc. The epoxy resins contain a curing agent. Polyamides and amines are preferred curing agents but acid or anhydride epoxy curing agents are useful. Amine and polyamide curing agents include resin materials such as, for example, primary amine functional acrylic resins. When a reactive polyamide is used, very thin primer coatings, e.g., 0.2 mil (0.005 mm.) in thickness, perform well. When the epoxy resins contain other type curing agents thicker coatings are necessary (higher percentage of solids in the dispersion). The ratio of epoxy resin to curing agent ranges from 1:1 to 4:1 and perhaps slightly higher.

The concentration range for the aqueous epoxy systems ranges from 7.5 to 40 percent by weight total solids. The degree of caustic resistance is dependent on the concentration (viscosity) of epoxy resin. Aqueous epoxy systems are preferred over organic solvent systems and powder form for economic reasons. Aqueous epoxy systems are better from pollution and fire hazard standpoints. Small amounts of water soluble organic solvents can be used in the aqueous epoxy systems, however, to enhance the wetting characteristics of the system. Eligible water soluble organic solvents are selected to be chemically inert with respect to other components in the primer systems.

Preferably the silane compound and epoxy resin are present in a single layer. Not only is one priming operation eliminated but the presence of the silane compound stabilizes the dispersion viscosity.

The primer compounds can be applied to the glass surface over a wide range of conditions. For example, the glass, at room temperature, preferably in the form of a bottle, but the glass can be flat or have other shapes, can be sprayed with a dispersion or solution of the primer containing epoxy resin, epoxy curing agent and an organofunctional silane; or the glass can be sprayed with a dispersion or solution of organofunctional silane and, preferably after drying, sprayed with a dispersion or solution of epoxy resin or the epoxy resin can be applied in the form of a powder. The solution temperatures range from 20° C. up to 70° C. or more. The concentration range of the silane compound when present with the epoxy resin is about 0.05 to 5 percent by weight, preferably about 2 percent by weight, based on the total weight of dispersion. When applied separately the organofunctional silane is present in a range of about 0.05 to 10 percent by weight, preferably about 2 percent by weight. A wetting agent, e.g., alcohols and ethers such as methanol, ethanol, diethylene glycol monoethyl ether, etc. and nonionic detergents such as the Igepal ® series sold by General Aniline and Film Company can be used in conjunction with the epoxy dispersions. Other coating techniques as previously described are also useful. The primer layer(s) is cured to the gel point which is understood to be to the point of solidification and not complete curing of the primer layer(s). Curing can be conducted by using convection air, e.g., 5 to 8 minutes at 205° C. or 60 to 120 seconds in an infrared oven with the surface of the quartz heaters at 788° C. The cured primer layer(s) can range in thickness from 0.1 to 3.0 mils (0.003 to 0.08 mm.).

Additives can be used in conjunction with the epoxy resin to extend the uncured pot life of the epoxy resin system. Additives eligible for use in practice of this invention include acetic acid and metal salts which form a complex with the epoxy curing agents. Water soluble zinc salts are preferred and zinc chloride is most preferred, because epoxy resins cured in the presence of zinc salts are not discolored and because the use of zinc salts provides an epoxy dispersion of increased viscosity more suitably adapted as a coating composition. The zinc salts are used in an amount of about 5 to 50 percent by weight and, preferably, about 15 to 30 percent by weight, of the amount of curing agent in the epoxy system.

Onto the cured primed surface of the glass is placed a copolymer of alpha-olefins, preferably an ionic copolymer powder. The copolymers can be 0 to 100 percent neutralized with metal ions. Also useful is a blend of such copolymer powder and a nylon powder. Preferred copolymers are described in U.S. Pat. No. 3,264,272, the disclosure of which is incorporated by reference. The copolymers may be applied in the form of a powder of 100 mesh or finer particles. Preferably the particles which make up the powder are in the form of spherical-shaped particles having an average diameter of 10 to 100 microns and are characterized by having a surface that is rough and is covered with hemispherical-shaped bumps about 0.1 micron in diameter at the base. The unique, spherical-shaped particles can be prepared by a method described in U.S. Pat. No. 3,933,954.

Illustrative of the polymers are copolymers of alpha-olefins of the formula $R—CH=CH_2$, where R is hydrogen or an alkyl radical of 1 to 8 carbon atoms; and alpha, beta-ethylenically unsaturated carboxylic acids having from 3 to 8 carbon atoms, and, optionally, a monoethylenically unsaturated monomer. Suitable olefins include ethylene, propylene, butene-1, pentene-1, hexene-1, heptene-1, 3-methylbutene-1, 4-methylpentene-1, etc. The preferred olefin is ethylene. Although polymers of olefins having higher carbon numbers can be employed in the present invention, they are not materials which are readily obtained or available. The concentration of the alpha-olefin is at least 70 mol percent in the copolymer and is preferably greater than 80 mol percent. Examples of alpha, beta-ethylenically unsaturated carboxylic acids are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because of its chemical reactivity being that of an acid. Similarly, other alpha, beta-monoethylenically unsaturated anhydrides of carboxylic acids can be employed. The preferred unsaturated carboxylic acids are methacrylic and acrylic acids. As indicated, the concentration of acidic monomer in the copolymer is from 0.2 mol percent to 5.0 mol percent.

The copolymer base need not necessarily comprise a two component polymer. Thus, although the olefin content of the copolymer should be at least 70 mol percent, more than one olefin can be employed to provide the hydrocarbon nature of the copolymer base. Additionally, other copolymerizable monoethylenically unsaturated monomers, illustrative members of which are mentioned below in this and the following paragraph, can be employed in combination with the olefin and the carboxylic acid comonomer. The scope of base copolymers suitable for use in the present invention is illustrated by the following two component examples: ethylene/acrylic acid copolymers, ethylene/methacrylic acid copolymers, ethylene/itaconic acid copolymers, ethylene/methyl hydrogen maleate copolymers, and ethylene/maleic acid copolymers, etc. Examples of tri-component copolymers include: ethylene/acrylic acid/methyl methacrylate copolymers, ethylene/methacrylic acid/ethyl acrylate copolymers, ethylene/itaconic acid/ methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

Other particularly preferred third monomeric components are the alkyl esters of an alpha, beta-ethylenically unsaturated carboxylic acid of 3 to 8 carbon atoms where the alkyl radical has 4 to 18 carbon atoms. Particularly preferred are the terpolymers obtained from the copolymerization of ethylene, methacrylic acid and alkyl esters of methacrylic and/or acrylic acid with butanol.

The concentration of the third optional component is 0.2 to 25 mol percent, based on the weight of copolymer, preferably from 1 to 10 mol percent. Representative examples of the third component include n-butyl acrylate, isobutyl acrylate, secondary butyl acrylate, tertiary butyl acrylate, n-butyl methacrylate, isobutyl methacrylate, sec-butyl methacrylate, t-butyl methacrylate, n-pentyl acrylate, n-pentyl methacrylate, isopentyl acrylate, isopentyl methacrylate, n-hexyl acrylate, n-hexyl methacrylate, 2-ethyl-hexyl acrylate, 2-ethyl-hexyl methacrylate, stearyl acrylate, stearyl methacrylate, n-butyl ethacrylate, 2-ethyl hexyl ethacrylate. Also, the third component includes mono- and di-esters of 4 to 8 carbon atom dicarboxylic acid such as n-butyl hydrogen maleate, sec-butyl hydrogen maleate, isobutyl hydrogen maleate, t-butyl hydrogen maleate, 2-ethyl hexyl hydrogen maleate, stearyl hydrogen maleate, n-butyl hydrogen fumarate, sec-butyl hydrogen fumarate, isobutyl hydrogen fumarate, t-butyl hydrogen fumarate, 2-ethyl hexyl hydrogen fumarate, stearyl hydrogen fumarate, n-butyl fumarate, sec-butyl fumarate, isobutyl fumarate, t-butyl fumarate, 2-ethyl hexyl fumarate, stearyl fumarate, n-butyl maleate, sec-butyl maleate, isobutyl maleate, t-butyl maleate, 2-ethyl hexyl maleate, stearyl maleate. The preferred alkyl esters contain alkyl groups of 4 to 8 carbon atoms. The most preferred contain 4 carbon atoms in the alkyl ester group. Representative examples of the most preferred esters are n-butyl acrylate, isobutyl acrylate, n-butyl methacrylate, isobutyl methacrylate, tertiary butyl acrylate, tertiary butyl methacrylate.

The copolymers may also, after polymerization but prior to any ionic crosslinking, be further modified by various reactions to result in polymer modifications which do not interfere with the ionic crosslinking. Halogenation of an olefin acid copolymer is an example of such polymer modification.

The preferred base copolymers, however, are those obtained by the direct copolymerization of ethylene with a monocarboxylic acid comonomer.

Metal ions which are suitable in forming the ionic copolymers employed in the present invention can be divided into two categories, uncomplexed metal ions and complexed metal ions. In the uncomplexed metal ions the valence of the ion corresponds to the valence of the metal. These metal ions are obtained from the commonly known and used metal salts. The complexed metal ions are those in which the metal is bonded to more than one type of salt group, at least one of which is ionized and at least one of which is not. Since the formation of the ionic copolymers requires only one ionized valence state, it will be apparent that such complexed metal ions are equally well suited in the present invention. The term "metal ion having one or more ionized valence states" means a metal ion having the general formula $Me^{+n}X_m$, where $n$ is the ionic charge and is at least one, X is a nonionized group and $n+m$ equal the valence of the metal. The utility of complexed metal ions employed in the formation of ionic copolymers corresponds in their ionized valences to those of the uncomplexed metal ions. The monovalent metals are, of course, excluded from the class of complexed metal ions but higher valent metals may be included depending on how many metal valences are complexed and how many can be ionized. The preferred metal ions are those in which all but one metal valences are complexed and one is readily ionized. Such compounds are in particular the mixed salts of very weak salts, such as oleic and stearic acid, with ionizable acids, such as formic and acetic acid.

The uncomplexed metal ions which are suitable in forming the ionic copolymers useful in the present invention, therefore comprise for the alpha-olefin-monocarboxylic acid copolymers, mono-, di- and trivalent ions of metals in Groups I, II, III, IV-A and VIII of the Periodic Table of Elements (see page 392, Handbook of Chemistry and Physics, Chemical Rubber Publishing Co., 37th ed.). Uncomplexed monovalent metal ions of the metals in the stated groups are also suitable in forming the ionic copolymers with copolymers of olefins and ethylenically unsaturated dicarboxylic acids. Suitable monovalent metal ions are $Na^+$, $K^+$, $Li^+$, $Cs^+$, $Ag^+$, $Hg^+$, and $Cu^+$. Suitable divalent metal ions are $Be^{+2}$, $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$ and $Y^{+3}$.

The preferred metal ions, regardless of the nature of the base copolymer are $Na^+$ and $Zn^{+2}$. These metals are preferred because they result in ionic copolymers having the best combination of improvement in solid state properties with retention of melt fabricability. It is not essential that only one metal ion be employed in the formation of the ionic copolymers and more than one metal ion may be preferred in certain applications.

While it is not necessary that the copolymers be neutralized, preferably they are neutralized in the range of 10 to 50 percent. It has been found that copolymeric layers comprising 100 percent neutralized copolymers are also useful. The fully neutralized copolymeric layers may be applied as such or may result from caustic treatment of glass bottles coated with a partially neutralized copolymeric layer.

The melt index of copolymer ranges from 0.1 g./10 minutes to 500 g./10 minutes, preferably 10 to 150 g./10 minutes.

The nylon powder used in the blend with copolymers of alpha-olefins to improve abrasion and heat resistance can be prepared from polycaprolactam (6-nylon), polyhexamethylene adipamide (66-nylon), polyhexamethylene sebacamide (610-nylon), polyhexamethylene dodecamide, as well as similar aliphatic polycarbonamides. The nylons must be capable of being melted to form the protective layer, thus the lower melting nylons are particularly useful. Crystal Clad ® nylon powder sold by General Mills is useful. This nylon is prepared from hexamethylene diamine, sebacic acid and another component which is believed to be a linoleic dimer or trimer.

The blend of copolymer and nylon powder can be prepared by dry blending the components to form a homogeneous mixture. Melt blending the copolymer and nylon resins prior to the production of the powder results in a powder useful to form coating with properties equal to or superior to those produced from the dry blend. In general 60 to 90 parts by weight of copolymer powder are blended with 10 to 40 parts by weight of nylon powder. A preferred blend is 80 parts by weight copolymer powder and 20 parts by weight of nylon powder.

The copolymer powder or blend with nylon powder can be placed on the primed surface by conventional electrostatic powder coating equipment. For flat glass objects, such as microscopic slides used in laboratory testing, the powder can be applied in such a manner that a cloud of powder falls or is sprinkled onto the glass held essentially horizontal. The copolymer powder or blend thereof is fused by convention heating or infrared radiation heating above the fusing point to form continuous coatings 4 to 12 mils (0.1 to 0.3 mm.), preferably 8 to 10 mils (0.2 to 0.25 mm.) in thickness. The fused ionic copolymer coating is desirably of such thickness to retain 90 to 100 percent of the glass fragments when a bottle pressured to 60 psig (4.22 kg./sq. cm.) is dropped 4 feet (1.22 m. ) onto a metal slab. While the coating thickness can vary, it is desirable to keep it as thin as possible to obtain the desired results.

A nylon protective layer can optionally be present on the copolymer layer. In forming the protective layer a nylon powder can be applied and fused over the layer of copolymer, or a nylon film may be laminated to the copolymer layer. It is desirable that the protective layer be clear and abrasion and heat resistant. Thickness of the protective layer is in the order of 1.5 to 2.0 mils (0.04 to 0.05 mm.).

The present invention has particular utility in providing returnable glass bottles for carbonated beverages which are stronger and more resistant to fracture on impact than glass alone and which, in case of fracture, provide a valuable safety factor by retaining the broken glass. The coatings in their preferred embodiments exhibit excellent resistance to hot caustic treatment solutions used to sterilize returnable glass bottles. The coatings of the present invention are also useful on other glass items such as fluorescent light bulbs, and protective screens for television tubes.

EXAMPLES OF THE INVENTION

The following Examples further illustrate the invention. All percentages are by weight unless otherwise indicated. The caustic solution is a 5 percent solution at 80° C. unless otherwise indicated.

EXAMPLE 1

Glass slides were primed with N-vinylbenzylaminoethyl-3-trimethoxysilylpropylamine hydrochloride, Dow Corning silane QZ-85069, by dipping in a 2 percent aqueous dispersion at ambient temperature for 30 seconds followed by air drying. The primed glass slides were dipped in an acetone solution of an epoxy resin of the formula:

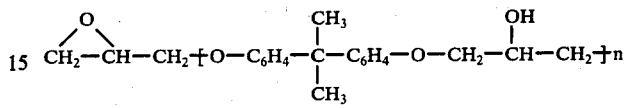

where $n$ is in the range of 1 to 20, Genepoxy ® 205 General Mills Co., containing a reactive polyamide containing excess amine groups as a curing agent, Versamid ® 5201 HR 65 General Mills Co. Total solids in the acetone solution were 55 percent and the epoxy resin/curing agent weight ratio was 1.4:1.0. The epoxy/curing agent coating was cured by maintaining the slides under an infrared radiation quartz heater manufactured by Hugo N. Cahnman Associates, Inc., Model ES-10 (1000 watts, 240 volts) for about 7 minutes. While still hot the slides were dipped in an ionic copolymer powder of a 24 percent sodium neutralized copolymer of ethylene with 11 percent methacrylic acid having a melt index of 20.4 g./10 minutes (ASTM D-1238, Condition E) having a volume average particle size of 37 microns determined by a Quantimet Image Analyzing Computer. The ionic copolymer was prepared as described in Example 1 of U.S. Pat. No. 3,933,954, issued Jan. 20, 1976. The powder was then fused by placing the slides under a horizontally mounted quartz heater for about 60 seconds. The ionic copolymer coating was about 8 mils (0.20 mm) thick. The coated slides were treated by placing them in caustic solution for 15 minute periods. The three-layer coating was still tenaciously bonded to the glass after forty-one 15 minute periods.

The above procedure was repeated except that the epoxy layer was omitted and the ionic copolymer coating was top coated with about a 3-mil (0.08 mm.) thick layer of nylon powder, Crystal Clad ® EP-2100 General Mills Company and believed to be a 610/636 copolymer. The glass slides withstood 13 periods of the caustic solution.

The procedure of paragraph one above was repeated except that the silane layer was omitted. After the epoxy layer was cured, it delaminated from the glass slide after only one 15 minute period in caustic solution.

The procedure of paragraph one above was repeated except that the layer of ionic copolymer was omitted. After the epoxy layer was cured, it withstood sixty-two 15 minute periods in caustic solution.

The procedure of paragragh one above was repeated except that in lieu of the epoxy layer the silane-treated slides were dipped in about a 12 percent chloroform solution of a low molecular weight polyamide derived from a reaction of dimer acid (aliphatic, dibasic acid produced by the polymerization of unsaturated fatty acids), Emerz ® 1537, Emory Industries, air dried and coated with ionic copolymer powder. In two 15 minute periods in caustic solution (70° C.) the ionic copolymer layer delaminated from the polyamide layer, the polyamide layer was tenaciously bonded to the glass after twenty 15 minute periods in the caustic solution.

EXAMPLE 2

Glass slides were primed with the silane described in Example 1 and were air dried. The slides were then dipped in an aqueous solution of epoxy resin of the formula:

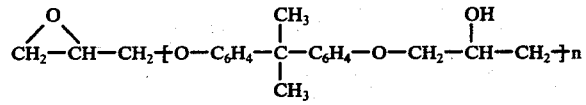

where $n$ is in the range of 1 to 20, General Mills Co. TSX 679 ®, 50 percent solids dispersion, containing a reactive polyamide containing excess amine groups as a curing agent, Versamid ® 5501 General Mills Co. Total solids in the dispersion were adjusted to 15 percent. The epoxy/curing agent weight ratio was 1.4:1.0. The epoxy layer was cured by maintaining the slides under the quartz heater described in Example 1 for 2 minutes. The slides were then dipped in the ionic copolymer powder described in Example 1 and the powder fused as described in that Example. The coated slides withstood at least thirty-six 15 minute periods in the hot caustic solution of Example 1.

The above procedure was repeated except that the ionic copolymer described in Example 1 was replaced with an unneutralized acid copolymer powder having a melt index of 10g./10 minutes and containing 9.0 percent methacrylic acid. The glass slides withstood at least twenty 15 minute periods in the caustic solution without delamination.

The above procedure was repeated except that the silane primer layer was omitted. The glass slides withstood only two 15 minute periods in the caustic solution before delamination of the ionic copolymer layer.

EXAMPLE 3

Glass slides were primed with the silane described in Example 1 and were air dried. The slides were preheated under the quartz heater of Example 1 for about 15 seconds and dipped in epoxy powder, Vitralon ® 80-1005, Pratt and Lambert Company. The powder was cured under the quartz heater for about 2 minutes. The thickness of the epoxy layer was about 1.0 mil (0.025 mm.). The slides were then dipped in the ionic copolymer powder described in that Example. The coated slides withstood at least fourty-nine 15 minute periods in the caustic solution of Example 1 without sign of delamination.

The above procedure was repeated except that the silane primer layer was omitted. The glass slides withstood four 15 minute periods in the caustic solution before delamination of the ionic copolymer layer.

EXAMPLE 4

Glass slides were primed with the silane described in Example 1 and were air dried. The slides were then primed with an aqueous dispersion of an epoxy resin of the formula:

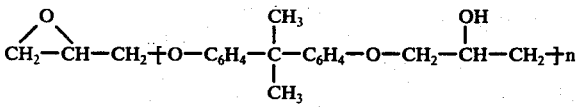

where $n$ is the range of 1 to 20, TSX 679 General Mills Co., containing as the curing agent a modified amine A-100 ®, General Mills Company which is a ketone blocked amine of the formula

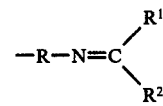

and a molecular weight of about 1100; functionality of about 4; equivalent weight of about 275; blocking agent: methyl isobutyl ketone. Total solids for the dispersion was adjusted to 16.6 percent and the epoxy-curing agent ratio was 1.26 to 1.0.

The epoxy layer was cured under a horizontally mounted quartz heater by maintaining the slides under the heater for 2 minutes. The slides were then dipped in the ionic copolymer powder described in Example 1 and the powder fused as described in that Example. The coated slides withstood at least twenty-eight 15 minute periods in the hot caustic solution of Example 1 without sign of delamination.

The above procedure was repeated except that the curing agent was omitted in the aqueous epoxy dispersion. The epoxy resin was adjusted to 10 percent and the epoxy layer was cured for greater than 6 minutes under the quartz heater described in Example 1. The final ionic copolymer coated slides showed signs of delamination after four 15 minute periods in the hot caustic solution.

EXAMPLE 5

Glass beverage bottles (Coca Cola returnable bottles No. 53201) were primed with the silane described in Example 1 and were air dried. The bottles were dipped in the aqueous solution of epoxy resin as described in Example 2. The total solids of the epoxy resin solution was adjusted to 25 percent and the epoxy/curing agent ratio was 2.0 to 1.0. The epoxy layer was cured in a convection air oven for 7 minutes at about 205° C. The bottles were coated with the ionic copolymer as described in Example 1, and the powder was fused as described in that Example. Cuts were made in the bottle coatings to simulate extreme bottle abuse. The bottles withstood forty 15 minute periods in the caustic solution (70° C.) of Example 1. After each period the bottles were abused in an American Glass Research bottle line simulator.

EXAMPLE 6

Glass beverage bottles described in Example 5 were primed with gamma-aminopropyltriethoxysilane, NH$_2$—(CH$_2$)$_3$—Si—(OC$_2$H$_5$)$_3$ A-1100 ® manufactured by Union Carbide by dipping the bottles in a 2 percent aqueous solution for 30 seconds at ambient temperature and were air dried. The bottles were dipped in the epoxy dispersion described in Example 5 and cured as described in that Example. The bottles were preheated to 177° C. in a convection air oven and coated with the ionic copolymer powder described in Example 1 using a Gema ® electrostatic spray gun (60 kilovolts), Interrad Corportion. The ionic copolymer powder was fused by post heating the bottles in the infrared oven described in Example 1 for about 45 seconds. The coatings were about 8 mils (0.2 mm.) thick. The bottles withstood thirty 15-minute periods in the caustic solution of Example 1 followed each time in the AGR line simulator of Example 5 without any signs of delamination.

The above procedure was repeated except that the epoxy layer was omitted. After undergoing seven caustic treatments (70° C.) as indicated above, coatings on 50 percent of the bottles delaminated from the glass, especially in the neck area.

The procedure described in the first paragraph of this Example except that the silane was a 2.0 percent aqueous dispersion as described in Example 1 and the epoxy layer was omitted. After undergoing nine caustic treatments (70° C.) as indicated above in paragraph 1 of this Example, coatings on 50 percent of the bottles delaminated from the glass, especially in the neck area.

EXAMPLE 7

Glass beverage bottles as described in Example 5 were primed with the silane described in Example 1 and were air dried. The bottles were dipped in the aqueous solution of epoxy resin as described in Example 2 except that the total solids (epoxy and curing agent) was adjusted to 7.5 percent. The epoxy/curing agent ratio was 2 to 1. The epoxy layer was cured in an infrared radiation oven described in Example 1 for about 1 minute. The bottles were then coated with the ionic copolymer powder as described in Example 6. After thirteen 15-minute periods in the caustic solution (70° C.) some signs of delamination appeared in the neck area of the bottles.

EXAMPLE 8

Glass beverage bottles as described in Example 5 were dipped in an aqueous epoxy dispersion as described in Example 2 containing about 2.0 percent silane as described in Example 1. The dispersion was adjusted to contain about 7.5 percent epoxy resin and curing agent. The epoxy/curing agent ratio was 2:1. The epoxy layer was cured as described in Example 7 followed by coating with ionic copolymer powder as described in Example 6. After thirteen 15-minute periods in caustic solution (70° C.) some signs of delamination appeared in the neck area of the bottles.

EXAMPLE 9

Glass beverage bottles as described in Example 5 were primed and cured as described in Example 7 except that the aqueous epoxy dispersion contained silane described in Example 1; the total solids was 15 percent epoxy and curing agent and 2 percent silane. After coating the bottles as described in Example 6, the bottles survived twenty-four 15-minute periods in caustic solution (70° C.) with no observable delamination.

The above procedure was repeated except that the epoxy dispersion was adjusted to 20 percent epoxy plus curing agent and 2 percent silane. The bottles survived twenty-four 15-minute periods in the caustic solution (70° C.) with no observable delamination.

The procedure of paragraph one of this Example was repeated except that the epoxy dispersion was adjusted to an epoxy/curing agent ratio of 1.4 to 1 (7.5 percent epoxy plus curing agent and 2 percent silane). The bottles survived twenty-eight 15-minute periods in the caustic solution (70° C.) with no observable delamination.

EXAMPLE 10

Glass beverage bottles as described in Example 5 were primed with the silane as described in Example 1 and were air dried. The bottles were dipped in an aqueous epoxy dispersion containing an epoxy compound of the formula:

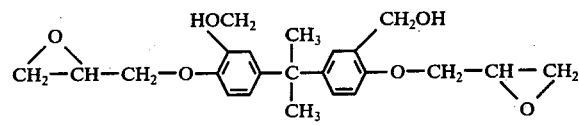

Apogen® 401 containing an epoxy curing agent 242 manufactured by M and T Chemical Company. The dispersion was adjusted to contain 40 percent epoxy plus the curing agent. The epoxy/curing agent ratio was 1.25 to 1.0. The epoxy layer was cured as described in Example 7. The bottles were coated with the ionic copolymer as described in Example 6. The bottles survived twenty 15-minute periods in the caustic solution (70° C.) with no observable delamination.

The above procedure was repeated except that the epoxy dispersion was adjusted to contain 35 percent epoxy plus the curing agent. The epoxy/curing agent ratio was 1.25 to 1.0. Some delamination of the coatings in the neck area of the bottles were noted after twelve 15-minute caustic treatment (70° C.) periods.

EXAMPLE 11

Glass beverage bottles were coated using an aqueous dispersion of 34.96 parts of liquid epoxy resin solution designated as Genepoxy® 370 H 55, General Mills Company; 3.85 parts of silane designated as Dow Silane Z-6032®, Dow Chemical Company; 4.81 parts of a reactive polyamide curing agent designated as Versamid® 125, General Mills Company; 0.71 parts of glacial acetic acid; 3.67 parts of diethylene glycol monoethyl ether as a wetting agent; and 52 parts of water. The epoxy/curing agent weight ratio was 4:1 and the total solids in the dispersion were about 25 percent. The epoxy was cured as described in Example 5. The bottles were coated with ionic copolymer as described in Example 1, and the powder was fused as described in Example 1.

EXAMPLE 12

Glass beverage bottles were coated using an aqueous dispersion of 28.27 parts of the epoxy of the previous example; 3.60 parts of the silane of the previous example; 5.91 parts of the epoxy curing agent of the previous example; 0.56 parts of zinc chloride; 4.92 parts of diethylene glycol monoethyl ether; and 56.74 parts of water. The epoxy/curing agent weight ratio was 2.63:1 and the total solids in the dispersion were about 23.5 percent. The epoxy was applied and fused as described in Example 11.

EXAMPLE 13

Glass beverage bottles were coated using an aqueous dispersion of 40.7 parts of the epoxy of Example 11; 3.8 parts of the silane of Example 11; 46.6 parts of a primary amine of functional acrylic resin epoxy curing agent such as that material designated as Dow XD-7080, Dow Chemical Company; and 44.2 parts of water. The epoxy/curing agent weight ratio was 2:1 and the total solids in the dispersion were about 35 percent. The epoxy was cured and the ionic copolymer was applied and fused as described in Example 7.

I claim:

1. Returnable glass bottles for carbonated beverages, said bottles being coated on the outer surfaces with a clear, cross-linked resin providing abrasion resistance and protection from flying glass in care of fracture, said coating being caustic-resistant, exhibiting strong adherence to glass even after repeated treatments with 5% aqueous NaOH at 80° C, said clear, abrasion- and causticresistant coating being at least 8 mils thick and comprising:
 1. a cured primer layer on the glass, and
 2. an outer layer of a copolymer of ethylene,
said primer layer (1) consisting essentially of
 A from 0.5 to 5% by weight of an organofunctional silane of the formula $(RO)_3Si(CH_2)_xR^1$, where RO— is a hydrolyzable alkoxy group in which R is an alkyl radical of 1 to 4 carbon atoms, $R^1$ is a functional group selected from —$NH_2$,

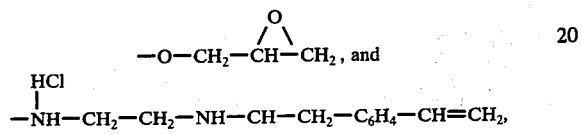

and
$x$ is an integer from 1 to 4, inclusive,
 B. an epoxy resin,
 C. a curing agent selected from the group consisting of amines and reactive polyamides containing excess amine groups,
and optionally at least one member of the group consisting of
 D. a water-soluble metal salt, and
 E. diethylene glycol monoethyl ether,
and the copolymer of said outer layer (2) consisting essentially of a random copolymer of ethylene in which the alpha, beta-unsaturated carboxylic acid is selected from the group consisting of acrylic acid and methacrylic acid having from 10% to 100% of the carboxyl groups ionized by metal ions having an ionized valence from one to three, inclusive, and in which the ethylene content of the copolymer is at least 70 mol %, based on the copolymer, the alpha, beta-unsaturated carboxylic acid content of said copolymer is from 0.2 to 5 mol %, inclusive, based on said copolymer, and any third monomer component optionally copolymerized in said copolymer is a monoethylenically unsaturated monomer.

2. A bottle of claim 1 in which the watersoluble metal salt (D) is zinc chloride.

3. A bottle of claim 1 in which the copolymer of outer layer (2) is a binary copolymer of ethylene and methacrylic acid neutralized to the extent of 10% to 50% with a monovalent metal ion.

4. A bottle of claim 1 in which the copolymer of outer layer (2) is a binary copolymer of ethylene and methacrylic acid neutralized to the extent of 10% to 50% with a divalent metal ion.

5. A bottle of claim 3 in which the monovalent metal ion is $Na^+$.

6. A bottle of claim 4 in which the divalent metal ion is $Zn^{+2}$.

7. Glass coated with a strongly adhering, clear caustic-resistant coating which comprises
 1. a cured primer layer consisting essentially of a combination of
  A. an organofunctional silane,
  B. an epoxy resin and
  C. a curing agent taken from the group consisting of amines and reactive polyamides containing excess amine groups
 where (A) and (B) and (C) are in a single layer or in two layers, (A) in a layer adjacent to the glass and (B) + (C) in a layer over (A), and
 2. a copolymeric layer consisting essentially of a copolymer of an alpha-olefin of the formula R—CH=$CH_2$, where R is a radical selected from the class consisting of hydrogen and alkyl radicals having from 1 to 8 carbon atoms, and alpha, betaethylenically unsaturated carboxylic acids having from 3 to 8 carbon atoms, said copolymers having from 0 to 100 percent of the carboxylic acid groups ionized by neutralization with metal ions, said metal ions having an ionized valence of from one to three inclusive when the unsaturated acid is a monocarboxylic acid and an ionized valence of one when the unsaturated acid is a dicarboxylic acid and said metal ions being selected from the group consisting of uncomplexed and complexed metal ions, said copolymer being a direct copolymer of the alphaolefin and the unsaturated carboxylic acid in which the carboxylic acid groups are randomly distributed over all molecules and in which
  a. the alpha-olefin content of the copolymer is at least 70 mol percent, based on the copolymer,
  b. the unsaturated carboxylic acid content of the copolymer is from 0.2 to 5 mol percent, based on the copolymer, and
  c. any other monomer component optionally copolymerized in said copolymer is monoethylenically unsaturated.

8. A coating on glass according to claim 7 wherein (A) and (B) and (C) are present in a single cured primer layer between the glass and the copolymeric layer.

9. A coating on glass according to claim 7 wherein (A) is present in a separate layer, the layer consisting of (A) being adjacent the glass.

10. A coating on glass according to claim 7 wherein the organofunctional silane (A) is a compound of the formula $(RO)_3Si(CH_2)_xR^1$, where R is an alkyl group of 1 to 4 carbon atoms; $R^1$ is $NH_2$—,

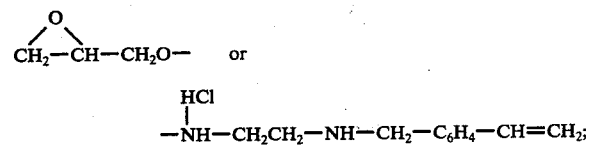

and $x$ is 1 to 4.

11. A coating on glass according to claim 10 wherein the organofunctional silane (A) is N-vinylbenzylaminoethyl-3-trimethoxysilylpropylamine hydrochloride.

12. A coating on glass according to claim 7 wherein the epoxy resin (B) is taken from the group consisting of epichlorohydrin/bisphenol A types and epoxy compounds containing 1 to 20 oxirane ring groups,

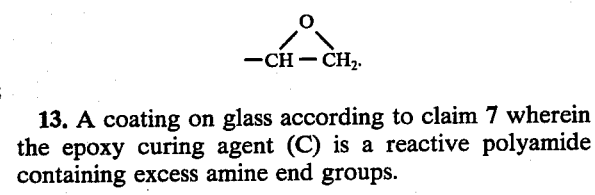

13. A coating on glass according to claim 7 wherein the epoxy curing agent (C) is a reactive polyamide containing excess amine end groups.

14. A coating on glass according to claim 7 wherein the epoxy resin curing agent (C) is an amine.

15. A coating on glass according to claim 7 wherein the copolymeric layer (2) is an ionic copolymer of ethylene and an unsaturated carboxylic acid selected from the group consisting of acrylic acid and methacrylic acid having from 10 to 50 percent of the carboxylic acid groups ionized by neutralization with metal ions.

16. A coating on glass according to claim 15 wherein the ionic copolymer is an ethylene/ methacrylic acid ionic copolymer and the metal ions are selected from the group consisting of $Na^+$ and $Zn^{+2}$.

17. A coating on glass according to claim 7 in which the primer layer (1) contains, in addition to ingredients (A), (B) and (C), ingredient (D), a water-soluble metal salt.

18. A coating on glass according to claim 17 in which the water-soluble metal salt is zinc chloride.

19. A coating on glass according to claim 17 in which the primer layer (1) contains, in addition to ingredients (A), (B), (C) and (D), ingredient (E), diethylene glycol monoethyl ether.

20. A coating on glass according to claim 7 in which the primer layer (1) contains, in addition to ingredients (A), (B) and (C), ingredient (E), diethylene glycol monoethyl ether.

* * * * *